US007910657B2

(12) United States Patent
Cohoon-Brister

(10) Patent No.: US 7,910,657 B2
(45) Date of Patent: Mar. 22, 2011

(54) PROCESS FOR THE MANUFACTURE OF POLYBUTYLENE TEREPHTHALATE COPOLYMERS FROM POLYETHYLENE TEREPHTHALATE, AND COMPOSITIONS AND ARTICLES THEREOF

(75) Inventor: Kristen Cohoon-Brister, Lutz, FL (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/346,108

(22) Filed: Dec. 30, 2008

(65) Prior Publication Data

US 2010/0168336 A1    Jul. 1, 2010

(51) Int. Cl.
*C08F 242/00*     (2006.01)

(52) U.S. Cl. ........ 525/190; 525/173; 525/174; 525/419; 525/444; 525/445; 525/448; 525/450

(58) Field of Classification Search .................. 525/165, 525/173, 174, 444, 445, 448, 450, 190, 419
See application file for complete search history.

(56) References Cited

U.S. PATENT DOCUMENTS

| | | | |
|---|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 3,047,539 A | 7/1962 | Pengilly |
| 3,907,868 A | 9/1975 | Currie et al. |
| 3,953,394 A | 4/1976 | Fox et al. |
| 3,953,404 A | 4/1976 | Borman |
| 4,128,526 A | 12/1978 | Borman |
| 4,609,680 A | 9/1986 | Fujita et al. |
| 5,266,601 A | 11/1993 | Kyber et al. |
| 5,413,681 A | 5/1995 | Tustin et al. |
| 5,451,611 A | 9/1995 | Chilukuri et al. |
| 5,559,159 A | 9/1996 | Sublett et al. |
| 6,162,837 A | 12/2000 | Gerking et al. |
| 6,384,129 B1 | 5/2002 | Lowry |
| 6,410,607 B1 | 6/2002 | Ekart et al. |
| 6,444,283 B1 | 9/2002 | Turner et al. |
| 6,515,044 B1 | 2/2003 | Idel et al. |
| 6,518,322 B1 | 2/2003 | West |
| 6,706,843 B1 | 3/2004 | Ishihara et al. |
| 6,794,463 B2 | 9/2004 | Aramaki et al. |
| 6,887,909 B2 | 5/2005 | Kawamura et al. |
| 6,927,275 B2 | 8/2005 | Hirokane et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 7,462,649 B2 | 12/2008 | Nakao et al. |
| 2002/0012807 A1 | 1/2002 | Kurian et al. |
| 2007/0203253 A1* | 8/2007 | Agarwal et al. ................. 521/48 |
| 2007/0208160 A1 | 9/2007 | Agarwal et al. |
| 2007/0244242 A1 | 10/2007 | Agarwal et al. |
| 2007/0275242 A1 | 11/2007 | Gopal et al. |
| 2007/0276069 A1 | 11/2007 | Agarwal et al. |

FOREIGN PATENT DOCUMENTS

| | | |
|---|---|---|
| EP | 0683201 A1 | 11/1995 |
| GB | 1500577 | 2/1978 |
| JP | 2000-256472 A | 9/2000 |
| JP | 2002060369 | 9/2000 |
| JP | 2005-89572 A | 4/2005 |
| KR | 20010083551 A | 9/2001 |
| WO | 03066704 A1 | 8/2003 |
| WO | 2007/089598 A1 | 8/2007 |

OTHER PUBLICATIONS

Pawlak, A.; Pluta, M.; Morawiec, J.; Galeski, A.; Pracella, M.; European Polymer Journal, 2000, 36, p. 1875-1884.*
International Search Report; International Application No. PCT/US2007/002197; International Filing Date: Jan. 26, 2007; Date of mailing: Jun. 19, 2007; 5 pages.
S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.
S. Sivaram et al., "Synthesis Characterization and Polycondensation of Bis-(4-Hydroxybutyl) Terephthalate," Polymer Bulletin 5, 1981, pp. 159-166, Springer-Verlag.
ASTM Designation: D 790-03, "Standard Test Methods for Flexural Properties of Unreinforced and Reinforced Plastics and Electrical Insulating Materials," pp. 1-11 (2003).
International Standard: ISO 178, "Plastics—Determination of Flexural Properties," 23 pgs. (2001).
International Standard: ISO 1133, "Plastics—Determination of the Melt Mass-Flow Rate (MFR) and the Melt Volume-Flow Rate (MVR) of Thermoplastics," pp. 1-16 (2005).
International Standard: ISO 11443, "Plastics—Determination of the Fluidity of Plastics Using Capillary and Slit-Die Rheometers," pp. 1-34 (2005). International Search Report and Written Opinion; International Application No. PCT/US2009/069079; International Filing Date Dec. 21, 2009; Applicant's file reference P090124PCT; Date of Mailing May 4, 2010; 13 pages.
"GE Gives Plastic Bottle Recycling a New Spin"; ChemicalProcessing.com, Aug. 25, 2006 [online], accessed via the internet [retrieved on Oct. 16, 2009], URS: <http://www.chemicalprocessing.com/industrynews/2006/056.html>; 2 pages.

* cited by examiner

*Primary Examiner* — David Wu
*Assistant Examiner* — Robert Jones, Jr.
(74) *Attorney, Agent, or Firm* — Cantor Colburn LLP

(57) ABSTRACT

A process comprises depolymerizing, with 1,4-butane diol, a first polymer comprising a polyethylene terephthalate component in the presence of at least one second polymer selected from the group consisting of polyvinyl chlorides, polyvinylidene chlorides, polyamides, polylactic acid, and combinations thereof to produce a molten mixture; and polymerizing the molten mixture under conditions sufficient to form a modified polybutylene terephthalate copolymer. The modified PBT comprises (a) at least one polyethylene terephthalate component residue, and (b) a member selected from the group consisting of (i) the at least one second polymer selected from the group consisting of polyvinyl chlorides, polyvinylidene chlorides, polyamides, polylactic acid, and combinations thereof; (ii) the at least one residue derived from the second polymer; and (iii) combinations thereof.

33 Claims, No Drawings

PROCESS FOR THE MANUFACTURE OF POLYBUTYLENE TEREPHTHALATE COPOLYMERS FROM POLYETHYLENE TEREPHTHALATE, AND COMPOSITIONS AND ARTICLES THEREOF

BACKGROUND OF THE INVENTION

This disclosure relates to a process for the manufacture of polybutylene terephthalate from polyethylene terephthalate, and compositions and articles thereof.

Thermoplastic molding compositions based on polybutylene terephthalate (PBT) are used in various applications. Although useful to many customers, conventional PBT molding compositions generally cannot be made from recycled sources of PBT due to the lack of availability of large post-consumer or post-industrial supplies of PBT scrap materials. Polyethylene terephthalate (PET), unlike PBT, is made in much larger quantities and is more easily recovered from consumer wastes.

With increasing demand for conserving non-renewable resources and more effectively recycling underutilized scrap PET, improved and less costly processes for deriving PBT from scrap PET materials are sought, in particular if the resulting derived PBT compositions possess desirable physical properties such as tensile and impact strength, and thermal properties. It would be particularly advantageous if the process were compatible with PET blend compositions comprising other polymer components and/or impurities.

BRIEF DESCRIPTION OF THE INVENTION

Described herein as a process comprising depolymerizing, with 1,4-butane diol, a first polymer comprising a polyethylene terephthalate component selected from the group consisting of polyethylene terephthalate homopolymers, polyethylene terephthalate copolymers, and combinations thereof, in the presence of at least one second polymer selected from the group consisting of polyvinyl chlorides, polyvinylidene chlorides, polyamides, polylactic acid, and combinations thereof, in a reactor at a first temperature and a first pressure that is at least atmospheric pressure, for a time and under conditions effective to produce a molten mixture. The molten mixture comprises a first component selected from the group consisting of oligomers containing ethylene terephthalate groups, oligomers containing ethylene isophthalate groups, oligomers containing diethylene terephthalate groups, oligomers containing diethylene isophthalate groups, oligomers containing butylene terephthalate groups, oligomers containing butylene isophthalate groups, covalently bonded oligomeric moieties containing at least two of the foregoing groups, 1,4-butane diol, ethylene glycol, and combinations thereof. The molten mixture comprises a second component selected from the group consisting of (i) the at least one second polymer selected from the group consisting of polyvinyl chlorides, polyvinylidene chlorides, polyamides, polylactic acid, and combinations thereof; (ii) at least one residue derived from the at least one second polymer selected from the group consisting of polyvinyl chlorides, polyvinylidene chlorides, polyamides, polylactic acid, and combinations thereof; and (iii) combinations thereof. Following depolymerization, the molten mixture is polymerized at a second temperature that is higher than the first temperature, a second pressure that is lower than the first pressure and that is subatmospheric pressure, with agitation and under an inert atmosphere, for a time and under conditions sufficient to form a modified polybutylene terephthalate copolymer. The modified PBT comprises (a) at least one polyethylene terephthalate component residue, and (b) a member selected from the group consisting of (i) the at least one second polymer selected from the group consisting of polyvinyl chlorides, polyvinylidene chlorides, polyamides, polylactic acid, and combinations thereof; (ii) the at least one residue derived from the second polymer; and (iii) combinations thereof.

In another embodiment, a composition comprises a modified polybutylene terephthalate copolymer that comprises (a) at least one residue derived from a polyethylene terephthalate component; and (b) a member selected from the group consisting of (i) at least one polymer selected from the group consisting of polyvinyl chlorides, polyvinylidene chlorides, polyamides, polylactic acid, and combinations thereof; (ii) at least one residue derived from a polymer selected from the group consisting of polyvinyl chlorides, polyvinylidene chlorides, polyamides, polylactic acid, and combinations thereof; and (iii) combinations thereof.

In still another embodiment, a composition comprises a modified polybutylene terephthalate copolymer as described above, wherein the modified PBT copolymer is derived from a polyethylene terephthalate mixture comprising a second polymer selected from the group consisting of more than 0 to less than 290 ppm polyvinyl chloride; more than 0 to less than 5.7 wt % Nylon 6; more than 0 to less than 5.7 wt % Nylon 6,6; and more than 0 to less than 8 wt % polylactic acid, each based on the parts by weight or weight of the polyethylene terephthalate component. The residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorus-containing compounds and anions, sulfur-containing compounds and anions, napthalene dicarboxylic acids, 1,3-propanediol groups, and combinations thereof.

These and other features, aspects, and advantages of the present invention will become better understood with reference to the following description and appended claims.

DETAILED DESCRIPTION OF THE INVENTION

Our invention is based on the discovery that it is now possible to make commercially useful modified poly(butylene terephthalate) copolymers from post-consumer and post-industrial poly(ethylene terephthalate) sources that contain other polymers, such as polyvinyl chlorides, polyvinylidene chlorides, polyamides, and polylactic acid. We have also discovered specific amounts of the polyvinyl chlorides, polyvinylidene chlorides, polyamides, and polylactic acid that can be present so that modified poly(butylene terephthalate) copolymers containing such materials exhibit preferred properties and are useful for commercial purposes. We have also discovered specific amounts of the polyvinyl chlorides, polyvinylidene chlorides, polyamides that render compositions unsuitable for commercial purposes.

More particularly, our invention is based on the discovery that polyethylene terephthalate (PET) can be converted to what is referred to herein as a modified polybutylene terephthalate (PBT), starting from PET blend compositions comprising at least one additional polymer, for example a polyvinyl chloride. The modified PBT compositions have physical properties suitable for commercial molding applications. Unlike conventional molding compositions containing virgin PBT (PBT prepared from monomers), the modified PBT used in the molded articles contains a polyethylene terephthalate residue, e.g., materials such as ethylene glycol and isophthalic acid groups (components that are not present in "virgin," monomer-based PBT). In some instances the modified PBT molding compositions exhibit improved flow and mechanical properties compared to molding compositions comprising virgin PBT. The process provides a valuable way to effectively recycle post-consumer or post-industrial streams of scrap PET for utilization in PBT molding applications. Further, the process can aid in the conservation of non-renewable resources and reduce the formation of greenhouse gases, e.g., $CO_2$.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight percent (wt. %) of the group in a molecule, the term "isophthalic acid group(s)" means the group or residue of isophthalic acid having the formula (—O(CO)$C_6H_4$(CO)—), the term "terephthalic acid group" means the group or residue of isophthalic acid having the formula (—O(CO)$C_6H_4$(CO)—), the term "diethylene glycol group" means the group or residue of diethylene glycol having the formula (—O($C_2H_4$)O($C_2H_4$)—), the term "butanediol group" means the group or residue of butanediol having the formula (—O($C_4H_8$)—), and the term "ethylene glycol group" means the group or residue of ethylene glycol having the formula (—O($C_2H_4$)—).

In general, the modified PBT copolymer (which can also be referred to as PET-modified PBT, or PET-derived PBT) is made by a process wherein the PET component is depolymerized in the presence of 1,4-butanediol and at least one second polymer selected from polyvinyl chloride, a polyvinylidene chloride, a polyamide, a polylactic acid, or a combination thereof, followed by polymerization of the depolymerized PET component with 1,4-butanediol, and a catalyst.

The PET component from which the modified PBT copolymer is made can be in a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid (an aliphatic polyester), and other contaminants. However, the examples herein demonstrate that effective conversion of PET to modified PBT is possible when polyvinyl chloride, polyvinylidene chloride, nylons, polylactic acid, and other polymer contaminants are present during the process. Also, the PET component can include PET that is not waste in flake, chip, or pellet form. As such, PET that would ordinarily be deposited in landfills can now be used productively and effectively. In one embodiment, the PET component can also include other polyesters and/or polyester copolymers derived from aromatic dicarboxylic acids. Examples of such materials include polyalkylene terephthalates such as polyethylene terephthalate, polycyclohexane terephthalate, copolyesters of terephthalate esters with comonomers containing cyclohexanedimethanol and ethylene glycol, copolyesters of terephthalic acid with comonomers containing cyclohexanedimethanol and ethylene glycol, polybutylene terephthalate, polyxylylene terephthalate, polydianol terephthalates, polytrimethylene terephthalate, polyester naphthalates, and combinations thereof.

In one embodiment, the 1,4-butanediol used in the manufacture of the modified PBT copolymer component is derived all or in part from a biomass, e.g., is a corn-derived 1,4-butanediol or a 1,4-butanediol derived from a cellulosic material. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant-based oils, among others. When this embodiment is used, the manufacture of compositions containing the modified polybutylene terephthalate can further reduce CO2 emissions that are ordinary generated when PBT is made from fossil fuel derived monomers. Also, this further reduces the amount of non-renewable hydrocarbon sources that are used in order to make the PBT.

In one specific method for the manufacture of the modified PBT copolymer, the PET component is (a) depolymerized in the presence of 1,4-butanediol, a catalyst, and at least one second polymer selected from the group consisting of polyvinyl chloride, polyvinylidene chloride, nylon, polylactic acid, and a combination thereof. The depolymerization step provides a molten mixture of oligomers containing ethylene terephthalate groups, oligomers containing ethylene isophthalate groups, oligomers containing diethylene terephthalate groups, oligomers containing diethylene isophthalate groups, oligomers containing butylene terephthalate groups, oligomers containing butylene isophthalate groups, and covalently bonded oligomeric moieties containing at least two of the foregoing groups. Suitable conditions for effecting the depolymerization include a pressure that is at least atmospheric pressure; and a temperature ranging from 180° C. to 230° C. The depolymerization mixture can optionally be agitated under an inert atmosphere. As such, our process converts poly(ethylene terephthalate) waste, e.g., the PET component to the modified poly(butylene terephthalate) copolymer by breaking down the poly(ethylene terephthalate) to its constituent monomers, or oligomers.

In a subsequent step (b), the temperature of the molten mixture is raised, and the pressure is decreased to subatmospheric pressure, to form the modified PBT copolymer, comprising polyester units selected from the following formulas (1), (2), (3), (4):

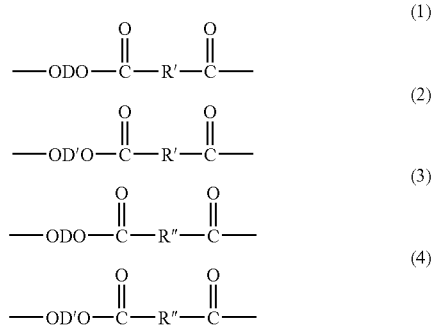

wherein D is a 1,4-butylene (—($C_4H_8$)—); D' is ethylene (—($C_2H_4$)—); R' is terephthalylene (-1,4-($C_6H_4$)—); and R" is an isophthalylene (-1,3-($C_6H_4$)—).

The 1,4-butanediol can be continuously refluxed back into the reactor during the depolymerization. In one embodiment, 1,4-butanediol is refluxed back into the reactor during the depolymerization (step(a)). In another embodiment, excess 1,4-butanediol, ethylene glycol, and tetrahydrofuran are removed during the polymerization (step(b)).

The PET component and the 1,4-butanediol component are generally combined under atmospheric pressure. It is also possible to use pressures that are higher than atmospheric pressures, for example 100 kPa to 500 kPa absolute. For instance, in one embodiment, the pressure at which the PET component and the 1,4-butanediol are subjected to is 200 kPa (2 atmospheres), or higher. With higher pressures, depolymerization can occur at temperatures higher than 230° C.

The temperature at which the PET component, the 1,4-butanediol, and the at least one second polymer are combined and reacted is sufficient to promote depolymerization of the PET component into components such as polyethylene terephthalate and polybutylene terephthalate oligomers, 1,4-butanediol, and ethylene glycol. More particularly, the PET component is depolymerized into oligomers containing ethylene terephthalate groups, oligomers containing ethylene isophthalate groups, oligomers containing diethylene terephthalate groups, oligomers containing diethylene isophthalate groups, oligomers containing butylene terephthalate groups, oligomers containing butylene isophthalate groups, and covalently bonded oligomeric moieties containing at least two of the foregoing moieties. The temperature at which the PET component and the 1,4-butanediol component are combined is generally from 180° C. to 230° C.

The 1,4-butanediol is generally used in excess amount relative to the PET component. In one embodiment, 1,4-butanediol is used in a molar excess amount ranging from 2 to 20, based on the moles of polyethylene terephthalate repeating unit.

During the initial stage of the process when the PET component and the 1,4-butanediol are combined and reacted (step (a)), the PET component depolymerizes into a molten mixture. As described above, the molten mixture contains at least polyethylene terephthalate and polybutylene terephthalate oligomers, 1,4-butanediol, and ethylene glycol. The 1,4-butanediol and ethylene glycol are generally recirculated, and tetrahydrofuran is distilled off during this step of the process. In one embodiment, the PET component can be also depolymerized with ethylene glycol or propylene glycol.

The duration of the depolymerization step is at least 30 minutes, depending on factors such as the equipment used, production needs, desired final properties, and the like. In one embodiment, the depolymerization step is carried out in at least 2 hours. In another embodiment, the depolymerization step is carried out in from 2 to 5 hours.

The process further includes the step of polymerizing the molten mixture at subatmospheric pressure and at an increased temperature of at least 230° C., more particularly 230° C. to 260° C., thereby forming the modified PBT copolymer derived from the PET component (step (b)).

Generally, the molten mixture is subjected to a second pressure lower than the first pressure. In one embodiment, the first pressure is reduced to a second pressure of 13.3 kPa to 0.0067 kPa in a continuous manner. In another embodiment, the first pressure is reduced to a second pressure of 1.33 kPa to 0.0134 kPa in a continuous fashion. More particularly the second pressure is less than 0.3 kPa absolute. Advantageously, the molten mixture can be placed under subatmospheric conditions without isolation and dissolution of any material from the molten mixture. The avoidance of this step greatly enhances the utility of the process. The polymerization is conducted with agitation and under an inert atmosphere.

The temperature at which the molten mixture is placed under subatmospheric conditions is sufficiently high to promote polymerization of the polyethylene terephthalate and polybutylene terephthalate oligomers, 1,4-butanediol, and ethylene glycol. More specifically, the temperature is 230° C. to 260° C.

During the step when the molten mixture is placed under subatmospheric conditions and the temperature is increased, excess 1,4-butanediol, ethylene glycol, and tetrahydrofuran (THF) can be removed from the reactor and oligomers are allowed to build in molecular weight. Agitation can be continuously provided to facilitate the removal of the low boiling components. After sufficient molecular weight is obtained, the resulting molten PBT polymer is dropped from the reactor, cooled, stranded, and chopped into pellets.

The duration of the step in which the molten mixture polymerizes from polyethylene terephthalate and polybutylene terephthalate oligomers, 1,4-butanediol, and ethylene glycol can vary, depending on factors such as the equipment used, production needs, desired final properties, and the like. In one embodiment, the polymerization is carried out for at least 60 minutes. In another embodiment, the polymerization step is carried out from 2 to 5 hours. The resulting mixture comprises modified PBT and at least one polyethylene terephthalate component residue. The modified PBT further comprises the at least one second polymer, at least one residue derived from the second polymer, or a combination thereof.

Both steps of the process can be carried out in the same reactor. In one embodiment, however, the process is carried out in at least two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

A catalyst can be used to facilitate the reaction. Exemplary catalysts include antimony compounds, tin compounds, titanium compounds, combinations thereof as well as many other metal catalysts and combinations of metal catalysts that have been disclosed in the literature. The amount of the catalyst will vary depending on the specific reaction components and conditions, and can be from 1 to 5000 ppm, or more. The catalyst component is generally added in step (a), during the initial combining of the PET component, the 1,4-butanediol, and the ionic monomer. In another embodiment, the catalyst component can be added to the molten mixture that forms after the PET component and the 1,4-butanediol are combined and reacted. The catalyst can also be added during both the depolymerization and polymerization steps.

The process for making the modified copolymer is preferably carried out under agitative conditions. The term "agitative conditions" or "agitation" refers to subjecting the PET component, the at least one second polymer, and the 1,4-butanediol to conditions that involve physical mixing of the PET component, the at least one second polymer, and 1,4-butanediol and promote the depolymerization of the PET in step (a), and/or subjecting the molten mixture to conditions that involve physically mixing the molten mixture to promote polymerization to form the modified PBT from polyethylene terephthalate oligomers, polybutylene terephthalate oligomers, 1,4-butanediol, and ethylene glycol in step (b). The physical mixing can be accomplished by methods known in the art. In one embodiment, a mixer containing rotating shaft and blades that are perpendicular to the shaft is used.

The process can include a step that reduces the amount of THF produced during the process by adding a basic compound containing an alkali metal to the reactor in the depolymerization step (a), polymerization step (b), or combination thereof, and thereby reducing formation of THF. The basic compound contains an alkali metal and can be, for example, sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, and combinations thereof. The amount of the basic compound added to a mixture is generally at least 0.1 ppm, specifically from 0.1 to 50 ppm, more specifically from 1 to 10 ppm, each based on the parts by weight of the modified poly(1,4-butylene terephthalate) copolymer. The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more. In another embodiment, the THF is reduced from at least 10% to 50%.

A difunctional epoxy compound can optionally be added to reduce the formation of THF. The epoxy compounds may be selected from the group of difunctional epoxies. Examples of suitable difunctional epoxy compounds include 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4-epoxycyclohexylcarboxylate. The amount of the epoxy added to the mixture is generally present in an amount of at least 0.05 wt. % (wt. %), specifically from 0.1 to 1 wt. %, more specifically from 0.2 to 0.5 wt. %, each based on the weight of the modified poly(1,4-butylene terephthalate) copolymer.

In another method for the manufacture the modified PBT copolymer, a three-step process is used. In this process, the PET component is (a) depolymerized in the presence of the at least one second polymer, ethylene glycol, propylene glycol, or a combination thereof, under conditions effective to provide a first molten mixture of oligomers containing ethylene terephthalate moieties, oligomers containing ethylene isophthalate groups, oligomers containing diethylene terephthalate groups, oligomers containing diethylene isophthalate groups, oligomers containing trimethylene terephthalate groups, oligomers containing trimethylene isophthalate groups, and covalently bonded oligomeric groups containing at least two of the foregoing groups. The first molten mixture further comprises the at least one second polymer, a residue derived from the second polymer, or a combination thereof. Suitable conditions for effecting the depolymerization include a pressure that is at least atmospheric pressure; a temperature ranging from 190° C. to 250° C.; and an inert atmosphere. The depolymerization of the PET component can be carried out for various times. In one embodiment, the depolymerization is carried out for at least 25 minutes.

In step (b) of the three-step process, 1,4-butanediol is added to the first molten mixture under conditions that are effective to form a second molten mixture containing a component selected from the group consisting of oligomers containing ethylene terephthalate groups, oligomers containing ethylene isophthalate groups, oligomers containing diethylene terephthalate groups, oligomers containing diethylene isophthalate groups, oligomers containing trimethylene terephthalate groups, oligomers containing trimethylene isophthalate groups, oligomers containing butylene terephthalate groups, oligomers containing butylene isophthalate groups, covalently bonded oligomeric moieties containing at least two of the foregoing groups, and combinations thereof. The second molten mixture further comprises the at least one second polymer, a residue derived from the second polymer, or a combination thereof. Suitable conditions for forming the second molten mixture are in a reactor in the presence of a catalyst component at a temperature ranging from 190° C. to 240° C.

In a subsequent step (c) of the three-step process, the temperature of the molten mixture is raised, and the pressure is decreased to subatmospheric pressure, to form the modified PBT copolymer, comprising polyester units selected from the following formulas (1), (2), (3), (4), (5), (6):

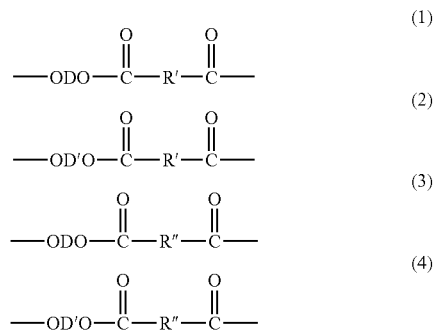

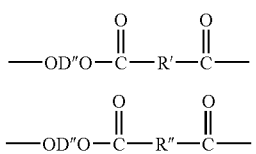

$$-OD''O-\overset{O}{\underset{\|}{C}}-R'-\overset{O}{\underset{\|}{C}}- \quad (5)$$

$$-OD''O-\overset{O}{\underset{\|}{C}}-R''-\overset{O}{\underset{\|}{C}}- \quad (6)$$

wherein D is 1,4-butylene (—(C$_4$H$_8$)—); D' is ethylene (—(C$_2$H$_4$)—); D" is 1,2-tripropylene, 1,3-tripropylene, or a combination thereof; R' is terephthalylene (-1,4-(C$_6$H$_4$)—); and R" is isophthalylene (-1,3-(C$_6$H$_4$)—).

It will be appreciated that the components in the first and second molten mixtures can vary, depending on the diol used in the depolymerization step (a) of the three-step process. When the PET component is depolymerized with ethylene glycol, the first molten mixture contains oligomers containing ethylene terephthalate groups, oligomers containing ethylene isophthalate groups, oligomers containing diethylene terephthalate groups, oligomers containing diethylene isophthalate groups, covalently bonded oligomeric moieties containing at least two of the foregoing groups, ethylene glycol, and combinations thereof. When the PET component is depolymerized with propylene glycol, the first molten mixture contains oligomers containing ethylene terephthalate groups, oligomers containing ethylene isophthalate groups, oligomers containing diethylene terephthalate groups, oligomers containing diethylene isophthalate groups, oligomers containing trimethylene terephthalate groups, oligomers containing trimethylene isophthalate groups, covalently bonded oligomeric moieties containing at least two of the foregoing groups, ethylene glycol, propylene glycol and combinations thereof. The propylene glycol can be either 1,3- or 1,2-propylene glycol, or a combination thereof.

The diol component (ethylene glycol, propylene glycol, and combinations thereof) can be present in step (a) of this three-step embodiment in a molar amount that is at least 25%, or alternatively at least 50% of the amount of ethylene glycol moieties present in the PET component.

The compounds used in the two-step or three-step process can be reused and/or collected as the process proceeds. In one embodiment, the ethylene glycol, propylene glycol, or combination thereof and the 1,4-butanediol are removed and collected in a vessel in step (b). In another embodiment, in step (b), 1,4-butanediol is refluxed back into the reactor and excess 1,4-butanediol, ethylene glycol, propylene glycol, tetrahydrofuran, or combinations thereof is removed. The duration of step (b) can also vary. Step (b) is conducted for a sufficient period of time to reduce at least 65% of the ethylene glycol from the second molten mixture. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure from 30 kPa to 150 kPa (300 to 1500 mbar) absolute. The 1,4-butanediol used during step (b) can be added in a molar amount that is in excess, e.g., at least 1.1 times molar excess, relative to the molar amount of 1,4-butanediol moieties incorporated into the modified PBT copolymer obtained in step (c). In another embodiment, 1,4-butanediol is used in a molar excess amount from 1.1 to 5.

Step (c) of the three-step process can also be carried out with modifications, depending on the application. In one embodiment, for instance, a component selected from the group of excess 1,4-butanediol, ethylene glycol, propylene glycol, tetrahydrofuran, or a combination thereof is removed during step (c). The pressure at which step (c) is carried out can also vary. In one embodiment, step (c) is carried out at a pressure that is less than 10 mbar.

The three-step process can be carried out in the same reactor. Alternatively, the three-step process can be carried out in at least two reactors.

This three-step process can optionally include the step of adding a basic compound as described above during step (a), step (b), step (c), or a combination thereof, to thereby further reduce THF production. Alternatively, difunctional epoxy compounds can optionally be added during step (b) in the amounts indicated above. Advantageously the three-step process can reduce the amount of THF by at least 30% as compared to the amount of tetrahydrofuran produced by the two-step process that depolymerizes the PET component with 1,4-butanediol instead of ethylene glycol, propylene glycol, or a combination thereof.

A solid-state polymerization step can optionally be used in either of the foregoing processes. The solid-state polymerization generally involves subjecting the modified PBT copolymer formed from the molten mixture to an inert atmosphere or subatmospheric pressure and heating to a temperature for a sufficient period of time to build the molecular weight of the modified PBT copolymer. Generally, the temperature to which the modified PBT copolymer is heated is below the melting point of the modified PBT copolymer, e.g., from 5 to 60° C. below the melting point of the modified PBT copolymer. In one embodiment, such a temperature may range from 150 to 210° C. Suitable periods of time during which the solid-state polymerization occurs may range from 2 to 20 hours, depending on the reaction components, conditions, and equipment used. The solid-state polymerization is generally carried out under tumultuous conditions sufficient to promote further polymerization of the modified PBT copolymer to a suitable molecular weight. Such tumultuous conditions may be created by subjecting the modified PBT copolymer to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 101 kPa to 0.1 kPa (1 atmosphere to 1 mbar).

The modified PBT copolymer formed by the above described methods comprises polyester units having at least one residue that is derived from a PET component. The residue derived from the PET component can be selected from the group consisting of ethylene glycol residues, diethylene glycol residues, isophthalic acid residues, antimony-containing compounds, germanium-containing compounds, titanium-containing compounds, cobalt-containing compounds, tin-containing compounds, aluminum-containing compounds, aluminum, aluminum salts, 1,3-cyclohexane dimethanol isomers, 1,4-cyclohexane dimethanol isomers (including cis-1,3-cyclohexane dimethanol, cis-1,4-cyclohexane dimethanol, trans-1,3-cyclohexane dimethanol, and trans-1,4-cyclohexane dimethanol), alkali salts, alkaline earth metal salts, including calcium, magnesium, sodium and potassium salts, phosphorus-containing compounds and anions, sulfur-containing compounds and anions, naphthalene dicarboxylic acids, and combinations thereof.

Depending on factors such as whether polyethylene terephthalate or polyethylene terephthalate copolymers are used, the residue derived from a PET component can include various combinations. In one embodiment, for instance, the residue includes mixtures of ethylene glycol and diethylene glycol. In another embodiment, the residue includes ethylene glycol, diethylene glycol, isophthalic acid, or combinations thereof. In another embodiment, at least one polyethylene terephthalate residue includes the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, or combinations thereof. In another embodiment, the residue can be a mixture of ethylene glycol, diethylene glycol, isophthalic acid residues, the cis isomer of a cyclohexane dimethanol, the trans isomer of a cyclohexane dimethanol, and combinations thereof. In one embodiment, the residue derived from polyethylene terephthalate includes ethylene glycol, diethylene glycol, cobalt-containing compounds, antimony-containing compounds, isophthalic acid groups, or combinations thereof.

The amount of the ethylene glycol groups (i.e., residues), diethylene glycol groups, and the isophthalic groups in the polymeric backbone of the modified PBT copolymer can vary, and can contain, for example, isophthalic acid groups in an amount that is at least 0.1 mole %, specifically from 0 or 0.1 to 10 mole % (0 or 0.07 to 7 wt. %). The modified PBT copolymer can contain ethylene glycol in an amount that is at least 0.1 mole % and can range from 0.1 to 10 mole % (0.02 to 2 wt. %). In another embodiment, the modified PBT copolymer has an ethylene glycol content that is more than 0.85 wt. %, or alternatively 0.1 to 2 wt. %. The modified PBT copolymer can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments. More particularly, the polyethylene terephthalate component residue is selected from the group consisting of ethylene glycol groups, diethylene glycol groups, and cyclohexane dimethanol groups; and the polyethylene terephthalate component residue is in an amount ranging from 0.1 to 10 mole %, based on 100 mole % of glycol in the modified polybutylene terephthalate copolymer. The polyethylene terephthalate component residue can further comprise isophthalic acid groups in an amount ranging from 0 to 10 mole %, based on 100 mole % of acid functionality in the modified polybutylene terephthalate random copolymer.

Unless otherwise specified, all molar amounts of the isophthalic acid groups and/or terephthalic acid groups are based on the total moles of acid functionality (diacids/diesters) in the composition. Unless otherwise specified, all molar amounts of the butanediol, ethylene glycol, and diethylene glycol groups are based on the total moles of diol in the composition. The wt. % measurements stated above are based on the way terephthalic acid groups, isophthalic acid groups, ethylene glycol groups, and diethylene glycol groups have been defined herein.

The total amount of the polyethylene terephthalate residue in the modified PBT copolymer can vary. For instance, the total amount of the residue can be from 1.8 to 2.5 wt. %, or from 0.5 to 2 wt. %, or from 1 to 4 wt. %. The ethylene glycol, diethylene glycol, and cyclohexane dimethanol groups can be individually or in combination present in an amount from 0.1 to 10 mole %, based on 100 mole % of glycol of the modified PBT copolymer. The isophthalic acid groups can be present in an amount from 0.1 to 10 mole %, based on 100 mole % of diacid/diester in the modified PBT copolymer.

When it is desirable to make a modified PBT copolymer having a melting point (Tm) that is at least 200° C., the total amount of diethylene glycol, ethylene glycol, and isophthalic acid groups can be adjusted to achieve the desired Tm. As such, in one embodiment, the total amount of the diethylene glycol, ethylene glycol, and isophthalic acid groups in the modified PBT copolymer is more than 0 and less than or equal to 23 equivalents, relative to the total of 100 equivalents of diol and 100 equivalents of diacid groups in the modified PBT copolymer. In another embodiment, the total amount of the isophthalic acid groups, ethylene glycol groups, and diethylene glycol groups is from 3 to less than or equal to 23 equivalents, relative to the total of 100 equivalents of diol and 100 equivalents of diacid groups in the modified PBT copolymer. In another embodiment, the total amount of the isophthalic acid groups, ethylene glycol groups, and diethylene glycol groups is from 3 to less than or equal to 10 equivalents, relative to the total of 100 equivalents of diol and 100 equivalents of diacid groups in the modified PBT copolymer. In another embodiment, the total amount of the isophthalic acid groups, ethylene glycol groups, and diethylene glycol groups is from 10 to less than or equal to 23 equivalents, relative to the total of 100 equivalents of diol and 100 equivalents of diacid groups in the modified PBT copolymer. In one embodiment, diethylene glycol, ethylene glycol, and/or isophthalic acid can be added during the process.

The total ethylene glycol groups, isophthalic acid groups, and diethylene glycol groups in the modified PBT copolymer can vary, depending on the application needs. In one embodiment, the composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified PBT copolymer. Advantageously, such compositions can maintain useful properties, such as heat deflection temperatures that are more than 80° C.

The total amount of inorganic residues derived from the PET component can be present in amounts from more than 0 parts per million (ppm), up to 1000 ppm, based on parts by weight of the modified PBT copolymer. Examples of such inorganic residues include of antimony-containing compounds, germanium-containing compounds, titanium-containing compounds, cobalt-containing compounds, tin containing compounds, aluminum-containing compounds, aluminum, aluminum salts, alkaline earth metal salts, alkali salts, including calcium, magnesium, sodium and potassium salts, phosphorus-containing compounds and anions, sulfur-containing compounds and anions, and combinations thereof. In another embodiment, the amounts of inorganic residues can be from 250 to 1000 ppm, specifically from 500 to 1000 ppm.

As described above, the at least one second polymer can be a polyvinyl chloride, a polyvinylidene chloride, a polyamide, a polylactic acid, or a combination thereof. The second polymer can potentially also generate residues, including oligomers of polymers, during the depolymerization and/or polymerization steps.

Polyamides are a generic family of resins known as nylons, characterized by the presence of an amide group (—C(O) NH—). Nylon-6 and Nylon-6,6 are the generally used polyamides and are available from a variety of commercial sources. Other polyamides, however, such as Nylon-4,6, Nylon-12, Nylon-6,10, Nylon-6,9, Nylon-6/6T and Nylon-6,6/6T with triamine contents below 0.5 wt. %, as well as others, such as the amorphous nylons, may be useful for particular applications. A specific polyamide is Nylon-6,6. Nylon-6, for example, is a polymerization product of caprolactam. Nylon-6,6 is a condensation product of adipic acid and 1,6-diaminohexane. Likewise, Nylon-4,6 is a condensation product of adipic acid and 1,4-diaminobutane. Besides adipic acid, other useful diacids for the preparation of Nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane, 2,2-di-(4-aminophenyl) propane, 2,2-di-(4-aminocyclohexyl)propane, among others. Copolymers of caprolactam with diacids and diamines are also useful. Polyamides that are themselves the product of a recycle process can be used. The polyamide can be present in amounts of more than 0 to less than 5.7 wt. %, more than 0 to less than 4.6 wt. %, or more than 0 to less than 1.45 wt. %, based on the total parts by weight of the polyethylene terephthalate component.

Possible residues from the polyamide include oligomers of polyamide; caprolactam, aminoacid monomers, diamine monomers, triamine monomers, and dicarboxylic acid monomers; monomeric or oligomeric terephthalimides, terephthalamides, isophthalimides, and isophthalamides formed by the condensation reaction of an amine with terephthalic or isophthalic acids or esters; monomeric or oligomeric esters formed by the reaction of ethylene glycol, 1,4-butanediol, propylene glycol, and/or cyclohexane dimethanol with the dicarboxylic acid used in the preparation of the polyamide; and combinations thereof.

Polyvinyl chloride (PVC) and polyvinylidene chloride (PVDC) include homopolymers of the general formulas (7) and (8) respectively,

(7)

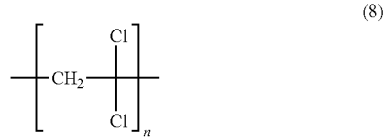

(8)

wherein n is the number of repeat units in the polymers, as well as copolymers of PVC and PVDC. Potential residues derived from PVC and PVDC include ene and polyene residues formed by the dehydrochlorination of the PVC and PVDC backbone, ether residues formed by the displacement of the PVC or PVDC chloride groups by ethylene glycol, 1,4-butanediol, and cyclohexane dimethanol, and combinations thereof. The PVC or PVDC can be present in amounts of more than 0 to less than 290 ppm, or more than 0 to less than 220 ppm, based on the total parts by weight of the polyethylene terephthalate component.

Polylactic acid (PLA), an alkyl polyester, includes PLA homopolymers of the general formula (9)

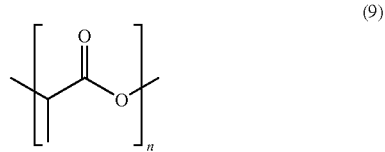

(9)

and copolymers thereof. Possible PLA residues include lactide; oligomers of polylactic acid; oligomers containing lactic acid esters with terephthalate groups; oligomers containing lactic acid esters with isophthalate groups; oligomers containing ethylene lactate groups; oligomers containing diethylene lactate groups; oligomers containing propylene lactate groups; oligomers containing trimethylene lactate groups; and covalently bonded oligomeric moieties containing at least two of the foregoing groups, and combinations thereof. The polylactic acid can be present in amounts of more than 0 to less than 8 wt. % based on the total parts by weight of the polyethylene terephthalate component.

The physical properties of the modified PBT copolymer can vary, depending on factors such as the performance properties that are required, the equipment used, process parameters, the identity of the second polymer, and the like. The molecular weight of the modified PBT copolymer can be generally at least 3,000 g/mol, specifically from 10,000 to 40,000 g/mol, more specifically from 15,000 to 30,000 g/mol.

The intrinsic viscosity (IV) of the modified PBT can be at least 0.4 dL/g, specifically from 0.5 to 1.3 dL/g, more specifically from 0.4 to 1.2 dL/g. All intrinsic viscosities in this application refer to those viscosities measured in a solution of 60 wt. % phenol and 40 wt. % 1,1,2,2-tetrachloroethane at 25° C.

The melting point of the modified PBT copolymer can be at least 200° C., at least 205° C., or at least 210° C. In another embodiment, the melting point can be from 200° C. to 230° C., or from 210° C. to 230° C.

The flexural modulus of the modified PBT copolymer can be at least 1000 MPa, specifically from 1000 MPa to 5000 MPa, measured more specifically from 2000 to 2500 Mpa, measured in accordance with ASTM 790 or ISO 178. The tensile strength (stress at yield) of the modified PBT can be at least 30 MPa, specifically from 30 MPa to 100 MPa in accordance with ASTM D638. The tensile elongation (at yield) of the modified PBT copolymer is at least 2% in accordance with ASTM D638.

The tensile elongation (break) of the modified PBT copolymer can be from at least 50%, more particularly 100 to 400%, measured in accordance with ASTM D638. The heat deflection temperature can be 40° C. to 120° C., specifically from 40° C. to 60° C. at 1.82 MPa for 3.2 mm bars, measured in accordance with ASTM D648. The heat deflection temperature can be 40° C. to 130° C., specifically from 50° C. to 120° C. at 0.455 MPa for 3.2 mm bars, measured in accordance with ASTM D648.

The notched Izod strength of the modified PBT copolymer can be at least 20 J/m, measured in accordance with ASTM D256, specifically from 20 J/m to 70 J/m, more specifically from 30 to 70 J/m at 23° C. The unnotched Izod strength of the modified PBT copolymer can be at least 500 J/m, measured in accordance with ASTM D256, specifically from 500 J/m to 3000 J/m, more specifically from 600 to 2500 J/m at 23° C., measured in accordance with ASTM D256.

Also disclosed is a composition comprising a modified PBT copolymer, comprising (a) at least one residue derived from a polyethylene terephthalate component; and (b) a member selected from the group consisting of (i) at least one polymer selected from the group consisting of polyvinyl chlorides, polyvinylidene chlorides, polyamides, polylactic acid, and combinations thereof; (ii) at least one residue derived from a polymer selected from the group consisting of polyvinyl chlorides, polyvinylidene chlorides, polyamides, polylactic acid, and combinations thereof; and (iii) combinations thereof. In one embodiment, an article comprises the composition.

The properties of the modified PBT copolymer composition vary depending on the identity of the second polymer used to produce the modified PBT polymer. For example, when the polyvinyl chloride is present in an amount of greater than 0 and less than 290 ppm based on the total parts by weight of the polyethylene terephthalate component, a molded sample of the composition can have an unnotched Izod strength of 1500 to 2500 J/m, measured in accordance with ASTM D256, and a tensile elongation at break of at least 100%, measured in accordance with ASTM D638. When the second polymer is Nylon 6 in an amount of more than 0 and less than 5.7 wt. %, based on the total weight of the polyethylene terephthalate component, a molded sample of the composition can have a tensile elongation at break that is at least 100%, measured in accordance with ASTM D638. When the second polymer is Nylon 6 in an amount of more than 0 and less than 1.45 wt. %, based on the total weight of the polyethylene terephthalate component, a molded sample of the modified polybutylene terephthalate copolymer can have a heat deflection temperature at 0.455 MPa that is at least 90° C., measured in accordance with ASTM D648. When the second polymer is Nylon 6,6 in an amount of more than 0 and less than 5.7 wt. %, based on the total weight of the polyethylene terephthalate component, a molded sample of the modified polybutylene terephthalate copolymer can have a tensile elongation at break that is at least 100%, measured in accordance with ASTM D638. When the second polymer is Nylon 6,6 in an amount of more than 0 and less than 4.6 wt. %, based on the total weight of the polyethylene terephthalate component, a molded sample of the modified polybutylene terephthalate copolymer can have a heat deflection temperature at 0.455 MPa that is at least 70° C., measured in accordance with ASTM D648.

In a more specific embodiment, a composition comprises a modified polybutylene terephthalate copolymer comprising (a) at least one residue derived from a polyethylene terephthalate component; and (b) a member selected from the group consisting of (i) at least one polymer selected from the group consisting of polyvinyl chlorides, polyvinylidene chlorides, polyamides, polylactic acid, and combinations thereof; (ii) at least one residue derived from a polymer selected from the group consisting of polyvinyl chlorides, polyvinylidene chlorides, polyamides, polylactic acid; and combinations thereof; and (iii) combinations thereof; wherein the modified polybutylene terephthalate copolymer is derived from a polyethylene terephthalate mixture comprising a second polymer selected from the group consisting of more than 0 to less than 290 ppm polyvinyl chloride, more than 0 to less than 5.7 wt % Nylon 6; more than 0 to less than 5.7 wt % Nylon 6,6; and more than 0 to less than 8 wt % polylactic acid, each based on the parts by weight or weight of the polyethylene terephthalate component; and the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorus-containing compounds and anions, sulfur-containing compounds and anions, napthalene dicarboxylic acids, 1,3-propanediol groups, and combinations thereof. More specifically, the at least one residue derived from the polyethylene terephthalate component comprises mixtures of ethylene glycol and diethylene glycol. Articles can comprise the composition.

The modified PBT copolymer can be used alone, e.g., as a molding composition, or in combination with a wide variety of other thermoplastic polymers, for example other polyesters, polyolefins (e.g., polyethylenes and polypropylenes), polycarbonates (e.g., polycarbonates derived from bisphenol A), polyimides, polyetherimides, polyamides, and the like.

The modified poly(butylene terephthalate) (PBT) copolymer generally has an inherent viscosity that ranges from 0.5 to 1.4 dL/g. In one embodiment, the modified poly(butylene terephthalate) copolymer has an inherent viscosity that ranges from 0.5 to 1.2 dL/g. The melting temperature of the modified poly(butylene terephthalate) copolymer is generally at least 200° C. and can range from at least 200° C. to 235° C. In one embodiment, the melting temperature is at least 210° C. In one embodiment, the melting temperature of the poly (butylene terephthalate) copolymer can range from 210° C. to 235° C.

Further, the process for making the PET-derived random, modified PBT copolymers used in the compositions can advantageously substantially reduce carbon dioxide emissions and solid waste. Since the PET-derived polyester random modified PBT copolymers made by the inventive process are made from scrap PET and not monomers, the process significantly reduces the amount of carbon dioxide emissions and solid waste. Carbon waste reduction (or crude oil savings) occurs because the carbon that constitutes the dimethyl terephthalate or terephthalic acid ordinarily used to make polyesters is not used, rather a PET component, e.g., polyester scrap, is replaced. The process to make DMT or TPA from crude oil is highly energy intensive and as a result, substantial emissions of CO2 to the atmosphere occur from burning of non-renewable energy sources. By not using DMT or TPA to make the modified PBT, carbon dioxide emissions savings are obtained. In one embodiment, the process for making modified PBT can eliminate at least 1 kg of $CO_2$ emissions for every kilogram of modified PBT made with the process, as compared to a process that makes virgin PBT homopolymers from monomers. In another embodiment, the process for making modified PBT can eliminate from 1 kg to 1.5 kg, or more $CO_2$ emissions for every kilogram of modified PBT made with the inventive process, as compared to a process that makes virgin PBT homopolymers from monomers. Additionally, there are energy savings/reduced carbon dioxide emissions when the ethylene glycol byproduct is recovered and is used instead of ordinary ethylene glycol in manufacturing.

Additionally, when the source of BDO is from biomass-derived feedstocks such as succinic acid, the carbon dioxide savings are further increased for two reasons. Biomass-derived succinic acid is made from sugars or other biomass-derived hydrocarbons that are the derived from atmospheric carbon versus fossil fuel carbon sources, thus reducing the environmental impact of the polymer derived from BDO based on succinic acid from biomass sources. Furthermore, the fermentation to yield succinic acid requires carbon dioxide as an input thus leading to further carbon dioxide reductions.

Advantageously, a molding composition containing the modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived PBT and the process for making 1 kg of the modified polybutylene terephthalate random copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified polybutylene terephthalate random copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT random copolymers present in an amount ranging from 5 to 90 wt. %), the $CO_2$ reduction index can be calculated by multiplying the lower amount of the polybutylene butylene terephthalate present in the composition, in percentage terms, with 1.3 (0.05×1.3=0.065) and the higher amount of the polybutylene terephthalate times 2.5. (0.90× 2.5=2.25).

These results can be derived and verified by using material and energy balance calculations (calculations that are well known in the chemical engineering art) and comparing the amount of energy used to make modified PBT random copolymers from PET and the amount of energy used to make PBT from terephthalic acid.

Advantageously, it is now possible to make modified poly (butylene terephthalate) copolymers from post-consumer and post-industrial poly(ethylene terephthalate) sources that contain other polymers, such as polyvinyl chlorides, polyvinylidene chlorides, polyamides, polylactic acid. This means that it is not necessary to subject post-consumer and post-industrial poly(ethylene terephthalate) sources containing other materials to expensive processing steps. Also, it is now possible to make modified poly(butylene terephthalate) copolymers with useful amounts of polyvinyl chlorides, polyvinylidene chlorides, polyamides, polylactic acids.

The modified PBT compositions are further described in the following illustrative examples in which all parts and percentages are by weight unless otherwise indicated.

EXAMPLES

Table 1 lists the components used in the following examples.
Materials

TABLE 1

| Abbreviation | Description | Supplier |
|---|---|---|
| PET | Recycle poly(1,4-ethylene terephthalate) pellets | N/A |
| PBT-1 | Poly(1,4-butylene terephthalate), IV = 0.66 dl/g as measured in a 60:40 wt. % phenol/tetrachloroethane mixture at 25° C. | SABIC Innovative Plastics |
| PBT-2 | Poly(1,4-butylene terephthalate), IV = 1.0 dl/g as measured in a 60:40 wt. % phenol/tetrachloroethane mixture at 25° C. | SABIC Innovative Plastics |
| PBT-3 | Poly(1,4-butylene terephthalate), IV = 1.2 dl/g as measured in a 60:40 wt. % phenol/tetrachloroethane mixture at 25° C. | SABIC Innovative Plastics |
| MBS | Methacrylate-butadiene-styrene emulsion copolymer impact modifier with core-shell structure | SABIC Innovative Plastics |
| AO | Antioxidant, pentaerythritol tetrakis(3,5-di-tert-butyl-4-hydroxyhydrocinnamate) sold as IRAGANOX ™ 1010 | Ciba Geigy |
| PVC | Polyvinyl chloride | SABIC Innovative Plastics |
| TPT | Titanium tetraisopropoxide | SABIC Innovative Plastics |
| BDO | 1,4-Butanediol | SABIC Innovative Plastics |
| Nylon 6 | NYLON 6 | SABIC Innovative Plastics |
| Nylon 6,6 | NYLON 6,6 | SABIC Innovative Plastics |
| PLA | Polylactic acid | SABIC Innovative Plastics |

Test Procedures

Intrinsic viscosity (IV) was measured in a solution of 60 wt. % phenol and 40 wt. % 1,1,2,2-tetrachloroethane at 25° C.

Melt Volume Rate (MVR) on pellets (dried for 2 hours at 120° C. prior to measurement) was measured according to ISO 1133 method at 250° C. and 5 kgf at dwelling time of 240 seconds and a 0.0825 inch (2.1 mm) orifice.

Capillary viscosity, which is another indicator of melt-flow was measured by ASTM D3835 or ISO D11433. Dried pellets were extruded through a capillary Rheometer and the force at varied shear rates was determined to estimate the shear viscosity.

Notched Izod impact (NII) strength was measured on 3×½×⅛ inch (76.2×12.7×3.2 mm) injection molded bars in accordance with ASTM D256. Bars were notched prior to oven aging, and samples were tested at room temperature (23° C.).

Tensile elongation (TE) at break was tested on 7×⅛ in. (177.8×3.3 mm) injection molded bars at room temperature with a crosshead speed of 0.2 in/min (5.08 mm/min) for un-filled samples in accordance with ASTM D638.

Flexural properties (flexular modulus, flexular stress at 5% strain, flexural stress at yield) were measured in accordance with ASTM 790 method.

Biaxial impact testing, sometimes referred to as instrumented impact testing, was performed in accordance with ASTM D3763 using a 4×⅛ inch (101.6×3.2 mm) molded discs. The total energy absorbed by the sample is reported as ft-lbs or J. Testing was done at room temperature on as molded or oven aged samples.

Heat Deflection Temperature (HDT) was tested on five bars having the dimensions 5×0.5×0.125 inches (127×12.7× 3.2 mm) in accordance with ASTM D648. The black specs were measured by counting the black specs present visually on the surface of a Dynatup disc.

A synopsis of all the relevant tests and test methods is given in Table 2.

TABLE 2

| Property | Test Standard | Specimen Type | Units |
|---|---|---|---|
| Flexural Tests | ASTM D790 | Bar - 127 × 12.7 × 3.2 mm | MPa |
| Heat Deflection Temperature (HDT) | ASTM D648 | Bar - 127 × 12.7 × 3.2 mm | °C. |
| Filled Tensile Tests | ASTM D638 | ASTM Type I Tensile bar | MPa |
| Notched Izod Impact (NII) at 23° C. | ASTM D256 | Bar - 63.5 × 12.7 × 3.2 mm | J/m |
| Multiaxial Impact | ASTM D3763 | Disk - 101.6 mm dia. × 3.2 mm thick | J |
| Shrinkage | GEP Method | Disk - 101.6 mm dia. × 3.2 mm thick | % |
| Melt Volume Rate (MVR) | ASTM D1238 | Pellets | g/10 min |
| Energy to max load | ASTM D3763 | Disk - 101.6 mm dia × 3.2 mm thick | J |
| Energy to failure | ASTM D3763 | Disk - 101.6 mm dia × 3.2 mm thick | J |
| Energy Total | ASTM D3763 | Disk - 101.6 mm dia × 3.2 mm thick | J |

Examples 1-8

Modified PBT Copolymer Molding Compositions Containing PVC

Examples 1 to 8 illustrate the properties of the modified PBT copolymer compositions as follows:

Example 1: modified PBT made from PET containing 115 ppm PVC

Example 2: modified PBT made from PET containing 287 ppm PVC

Example 3: modified PBT made from PET containing 575 ppm PVC

Example 4: modified PBT made from PET containing 1150 ppm PVC

Examples 1 and 3 were prepared in a helicone reactor with the capacity of 65 gallons about 200 liters) whereas Examples 2 and 4 were prepared in a helicone reactor with the capacity of 10 gallons (about 40 liters).

The raw materials used to prepare the modified PBT copolymers of Examples 1-4 are summarized in Table 3.

TABLE 3

| Parameter | Unit | 1 | 2 | 3 | 4 |
|---|---|---|---|---|---|
| Polyester Type | | Recycled PET | Recycled PET | Recycled PET | Recycled PET |
| BDO:PET Mole Ratio | | 3:1 | 3:1 | 3:1 | 3:1 |
| PET | Kgs | 45.4 | 11.4 | 45.4 | 11.4 |
| BDO | Kgs | 63.6 | 15.9 | 63.6 | 15.9 |
| PVC | gms | 5.2 | 3.25 | 26 | 13 |
| TPT (as elemental Ti) | ppm | 60 | 60 | 60 | 60 |

Examples 1 and 3

200 Liter Pilot Plant Process (BDO:PET=3:1)

The helicone reactor had a capacity of 200 liters and was equipped with a special design of twin opposing helical blades with 270 degree twist; constructed of 316 stainless steel with 16 g polish finish. The blade speed could be varied from 1 to 65 rpm. The agitators were connected to a Constant Torque Inverter Duty Motor, which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

100 lbs (45.4 kg) of recycle PET pellets with 140 lbs (63.6 kg) of butanediol (BDO), (molar ratio 2.9:1) were charged to the helicone reactor. 18.8 ml (60 ppm as Ti) of titanium tetraisopropoxide (TPT) catalyst was also added to the reaction mix. PVC pellets were weighed (5.2 and 26 gms respectively for examples 1 and 3) and added to the reactor as well. The temperature of the heating oil (for the helicone) was set to 250° C. The agitator speed was set at 67% of maximum. The butanediol was refluxed into the reactor for 2 hours. The design of the overhead condenser system did not allow a complete reflux of the butanediol. As a result, about 5 to 10 lbs (2.3 to 4.5 kg) of butanediol evolved in the initial stages could not be refluxed. The butanediol evolved after that could be completely refluxed into the reactor.

For the polymerization stage, a vacuum was applied to the helicone reactor and the reflux of butanediol to the reactor was discontinued. The speed of the agitator was set to 60% of max and the target amps of the motor were 3.5 amps. The system pressure was brought down to 0.5 Torr (0.066 kPa) by the vacuum blower. The reaction was carried out until the polymer mass reached its third build. The reaction was stopped after 15 minutes into the third build and the polymer was cast in blobs. The products were then allowed to dry and ground into pellets.

Examples 2 and 4

40-Liter Pilot Plant Process (BDO:PET=3:1)

The helicone reactor had a capacity of 40 liters and was equipped with a special design of twin opposing helical blades with 270 degree twist; constructed of 316 SS with 16 g polish finish. The blade speed could be varied from 1 to 65 rpm. The agitators were connected to a 7.5 HP Constant Torque Inverter Duty Motor, which operates at 230/460 VAC, 3 PH, and 60 Hz. These agitators provided excellent surface area for the polymer melt in order to build molecular weight. The helicone was also designed with an overhead condenser to condense the vapors in the glycolysis, transesterification (if any), and polymerization stages.

25 lbs (11.4 kg) of recycle PET pellets with 35 lbs (15.9 kg) of butanediol (molar ratio 2.9:1) were charged to the helicone reactor. 4.6 ml (60 ppm as Ti) of TPT catalyst were also added to the reaction mix. PVC pellets were weighed (3.25 and 13 gms respectively for examples 2 and 4) and added to the reactor as well. The temperature of the heating oil (for the helicone) was set to 250° C. The agitator speed was set at 67% of maximum. The butanediol was refluxed into the reactor for 2 hours. The overhead condenser system did not allow a complete reflux of the butanediol. As a result, about 5 to 10 lbs (2.3 to 4.5 kg) of butanediol evolved in the initial stages could not be refluxed. The butanediol evolved after that could be completely refluxed into the reactor.

For the polymerization stage, a vacuum was applied to the helicone reactor and the reflux of butanediol to the reactor was discontinued. The speed of the agitator was set to 60% of max and the target amps of the motor were 3.5 amps. The system pressure was brought down to 0.066 kPa (0.5 Torr) by the vacuum blower. The reaction was carried out until the polymer mass reached its third build. The reaction was stopped after 15 minutes into the third build and the polymer was cast in blobs. The products were then allowed to dry and ground into pellets. The logic for changes in agitator speed as the molecular weight of the polymer built up is shown in Table 4.

TABLE 4

| Stage | Build | Agitator Speed | Target Amp | Rpm |
|---|---|---|---|---|
| Ester Interchange | N/A | 66.7% | N/A | 34 |
| Polymerization | 1st | 60% | 3.5 | 32 |
|  | 2nd | 30% | 3.8 | 16 |
|  | 3rd | 18% | 4.5 | 9 |

The following tests were conducted on Examples 1-4: IV measurement, NMR analysis, and differential scanning calorimetry (DSC) analysis. The results are summarized in Table 5. Comparative Example A is a commercially available PBT (PBT-2) manufactured from monomers.

TABLE 5

| Item | Parameter | Unit | Comparative A | 1 | 2 | 3 | 4 |
|---|---|---|---|---|---|---|---|
|  | PVC ppm based on PET component | ppm | — | 115 | 287 | 575 | 1150 |
| DSC Data | Melting Point | °C. | 229.1 | 218.6 | 219.2 | 220.5 | 221.2 |
|  | Crystallization Temperature | °C. | 167.3 | 178.6 | 168.4 | 169.7 | 161.1 |
|  | Delta H fusion | kJ/kg | 37.9 | 32.5 | 23.6 | 27.8 | 21.6 |
|  | Delta H crystallization | kJ/kg | 44.9 | 39.7 | 36.7 | 41.2 | 36.3 |
| Intrinsic Viscosity | IV | Dl/g | 1.0 | 1.13 | 1.06 | 1.04 | 1.12 |
| Composition by NMR analysis (based on total diol and diacid units) | Ethylene Glycol (EG) Repeat Unit | mol % | 0.0 | 0.7 | 1.6 | 0.6 | 0.9 |
|  | Diethylene Glycol (DEG) Repeat Unit | mol % | 0.0 | 0.2 | 0.4 | 0.2 | 0.3 |
|  | 1,4-Butanediol (BDO) Repeat Unit | mol % | 50.0 | 48.8 | 48.4 | 48.9 | 49.1 |
|  | Isophthalic Repeat Unit | Mol % | 0.0 | 1.0 | 1.1 | 1.0 | 1.0 |
|  | Terephthalic Repeat Unit | Mol % | 50.0 | 49.1 | 49.0 | 48.9 | 50.3 |
|  | Total Comonomers | Mol % | 0.0 | 1.9 | 3.1 | 1.8 | 2.2 |
|  | Total Comonomer Equivalents | ** | 0.0 | 2.8 | 6.2 | 3.6 | 4.4 |

** Residual equivalents relative to the total of 100 equivalents of diol and 100 equivalents of diacid groups It is evident from the above examples that modified PBT copolymer with a comparable molecular weight to PBT made from monomers can be obtained by the processes describe herein.

The physical and mechanical properties of each of Examples 1-4 were also measured, and are summarized in Table 6.

TABLE 6

| Property (Units) | Comparative A | 1 | 2 | 3 | 4 |
|---|---|---|---|---|---|
| PVC ppm based on PET component | — | 115 | 287 | 575 | 1150 |
| Modulus of Elasticity (MPa) | 2600 | 2650 | 2830 | 2760 | 2450 |
| Stress at Yield (Mpa) | 53.9 | 54.4 | 48.98 | 49.9 | 48.3 |
| Stress at Break (MPa) | 31.5 | 38.7 | 48.1 | 49.6 | 5.18 |
| Tensile Elongation at Yield (%) | 3.4 | 3.2 | 2.8 | 2.8 | 2.6 |
| Tensile Elongation at Break (%) | 390.5 | 331.2 | 2.6 | 3.1 | 2.6 |
| HDT at 0.455 MPa (° C.) | 111 | 86.65 | 111.6 | 119.2 | 54.3 |
| HDT at 1.82 MPa (° C.) | 46.9 | 43.4 | 47.3 | 48.6 | 44.9 |
| Notched Izod (J/m) | 55.8 | 59.2 | 54.4 | 53.9 | 54.4 |
| Unnotched Izod (J/m) | 1979 | 2090.98 | 623.55 | 720.36 | 947 |
| Flexural Modulus (MPa) | 2350 | 2380 | 2440 | 2460 | 2410 |
| Flexural Stress at 5% Strain (MPa) | 78.6 | 75.7 | 82.4 | 81.8 | 78.6 |
| Flexural Stress at Yield (MPa) | 79.6 | 75.8 | 82.9 | 82.2 | 78.6 |
| Energy to max load (J) | 28.6 | 2.52 | 2.86 | 1.64 | 2.42 |
| Energy to failure (J) | 53.7 | 2.86 | 3.2 | 2.1 | 2.98 |
| Energy Total (J) | 54.3 | 3.72 | 3.6 | 3.3 | 3.02 |
| Max Load (kN) | 3.961 | 1.078 | 1.132 | 0.799 | 0.788 |
| Deflection at max load (mm) | 14 | 4.46 | 4.68 | 4.44 | 6.1 |
| Mold Shrink Parallel (%) | 1.74 | 1.17 | 2.12 | 1.93 | 1.55 |

TABLE 6-continued

| Property (Units) | Comparative A | 1 | 2 | 3 | 4 |
|---|---|---|---|---|---|
| Mold Shrink Perpendicular (%) | 1.83 | 1.13 | 2.09 | 1.92 | 1.48 |
| MVR (cc/10 min) | 17.8 | 28.9 | 29.5 | 23.6 | 20.9 |

The above examples demonstrate that the unnotched Izod impact strength and the elongation at break of the modified PBT copolymer samples drop substantially when the PVC concentration in the PET component is above 287 ppm (Examples 3 and 4).

Examples 5 to 8

Molding Compositions Made From Modified PBT Containing Nylon 6

Several molding compositions were made from modified PBT resins containing different levels of Nylon 6:
Example 5: modified PBT made from PET containing 1.15 wt. % Nylon 6
Example 6: modified PBT made from PET containing 1.44 wt. % Nylon 6
Example 7: modified PBT made from PET containing 2.9 wt. % Nylon 6
Example 8: modified PBT made from PET containing 5.7 wt. % Nylon 6

Examples 5 to 8 (modified PBT) were prepared in a helicone reactor with the capacity of 65 gallons (about 200 liters). Raw material amounts are listed in Table 7.

TABLE 7

| Parameter | Unit | 5 | 6 | 7 | 8 |
|---|---|---|---|---|---|
| Polyester Type | | Recycled PET | Recycled PET | Recycled PET | Recycled PET |
| BDO:PET Mole Ratio | | 3:1 | 3:1 | 3:1 | 3:1 |
| PET Weight | Kgs | 45.4 | 45.4 | 45.4 | 45.4 |
| BDO Weight | Kgs | 63.6 | 15.9 | 63.6 | 15.9 |
| Nylon 6 Weight | gms | 520 | 650 | 1300 | 2600 |
| TPT as Ti element | ppm | 60 | 60 | 60 | 60 |

Similar testing protocols were followed for measurement of properties as described above. DSC, IV, and composition data by NMR of the Examples 5-8 and Comparative Example A (PBT-2, prepared from its monomers) are shown in Table 8.

TABLE 8

| Item | Parameter | Unit | Comp. A | 5 | 6 | 7 | 8 |
|---|---|---|---|---|---|---|---|
| DSC Data | Melting Point | °C. | 229.1 | 215.8 | 213.1 | 214.6 | 209.7 |
| | Crystallization Temp | °C. | 167.3 | 174.2 | 173 | 173 | 167.9 |
| | Delta H fusion | °C. | 37.9 | 32.1 | 32.6 | 31.8 | 33 |
| | Delta H crystallization | kJ/kg | 44.9 | 41.3 | 41.8 | 40.5 | 42.4 |
| IV | | Dl/g | 1.0 | 1.06 | 1 | 0.95 | 0.88 |
| Composition by NMR analysis (based on total diol and diacid units) | EG Repeat Unit | Mol % | 0.0 | 1.4 | 1.9 | 1.4 | 0.7 |
| | DEG Repeat Unit | Mol % | 0.0 | 0.3 | 0.3 | 0.3 | 0.2 |
| | BDO Repeat Unit | Mol % | 50.0 | 48.3 | 47.5 | 47.5 | 46.7 |
| | Isophthalic Repeat Unit | Mol % | 0.0 | 1.1 | 1.2 | 1.1 | 1 |
| | Terephthalic Repeat Unit | Mol % | 50.0 | 49.1 | 49.0 | 48.9 | 50.3 |
| | Total Comonomers | Mol % | 0.0 | 2.8 | 3.4 | 2.8 | 1.9 |
| | Total Comonomer Equiv. | ** | 0.0 | 5.6 | 6.8 | 5.6 | 3.8 |
| | Nylon 6 | Wt. % | | 0.9 | 1.1 | 2.1 | 4.4 |

** Residual Equivalents relative to the total of 100 equivalents of diol and 100 equivalents of diacid groups.

It is evident from the above examples that one could make modified PBT with a comparable molecular weight to PBT prepared from monomers. It should also be noted that no substantial degradation of the Nylon 6 material was observed in the polymerization process. Surprisingly, the Nylon 6 seems to retain its identity as a separate polymer through the polymerization process. The physical and mechanical properties of Examples 5 to 8 were also measured and are shown in Table 9.

TABLE 9

| Property | Comparative A | 5 | 6 | 7 | 8 |
|---|---|---|---|---|---|
| Modulus of Elasticity (MPa) | 2600 | 2620 | 2660 | 2628 | 2630 |
| Stress at Yield (MPa) | 53.9 | 54.6 | 55.7 | 55.4 | 57.3 |
| Stress at Break (MPa) | 31.5 | 30.6 | 28 | 29.8 | 56.3 |
| Tensile Elongation at Yield (%) | 3.4 | 3.2 | 3.2 | 3 | 3.2 |
| Tensile Elongation at Break (%) | 390.5 | 374.8 | 284.4 | 259.5 | 3.5 |
| HDT at 0.455 MPa (° C.) | 111 | 108.6 | 60.8 | 61.3 | 64.5 |
| HDT at 1.82 MPa (° C.) | 46.9 | 45.9 | 45.1 | 44.8 | 46.9 |
| Notched Izod (J/m) | 55.8 | 61.2 | 56.8 | 54.3 | 46.6 |
| Unnotched Izod (J/m) | 1979 | 1981 | 2000 | 2130 | 2000 |

TABLE 9-continued

| Property | Comparative A | 5 | 6 | 7 | 8 |
|---|---|---|---|---|---|
| Flexural Modulus (MPa) | 2350 | 2300 | 2350 | 2350 | 2400 |
| Flexural Stress at 5% Strain (Mpa) | 78.6 | 73.8 | 77.8 | 77.3 | 82 |
| Flexural Stress at Yield (MPa) | 79.6 | 74 | 77.9 | 77.4 | 82 |
| Energy to max load (J) | 28.6 | 28.7 | 31.6 | 27 | 13.6 |
| Energy to failure (J) | 53.7 | 47.1 | 51.9 | 41.3 | 20.2 |
| Energy Total (J) | 54.3 | 47.4 | 52.4 | 41.8 | 20.3 |
| Max Load (kN) | 3.961 | 3.874 | 4.212 | 3.814 | 2.516 |
| Deflection at max load (mm) | 14 | 14.3 | 15 | 13.4 | 8.94 |
| Mold Shrink Parallel (%) | 1.74 | 1.41 | 1.52 | 1.57 | 1.47 |
| Mold Shrink Perpendicular (%) | 1.83 | 1.36 | 1.48 | 1.54 | 1.44 |
| MVR (cc/10 min) | 17.8 | | 51.5 | 55.3 | 79.8 |

It is seen from the above examples that the heat deflection temperature (at 0.455 MPa) of the modified PBT drops substantially as Nylon 6 concentration is increased beyond 1.15 wt. % in the PET component. The examples also show that the tensile elongation at break in the modified PBT drops substantially above Nylon 6 concentration of 2.9 wt. % in the PET component of the modified PBT.

Examples 9 to 11

Modified PBT Containing Nylon 6,6

The following compositions were made from modified PBT resins containing different levels of Nylon 6,6. The examples that were generated are as follows:

TABLE 10

| Parameter | Unit | 9 | 10 | 11 |
|---|---|---|---|---|
| Nylon-6,6 as % of PET Component | % | 2.9 | 4.6 | 5.75 |
| Polyester Type | | Post-Consumer PET | Post-Consumer PET | Post-Consumer PET |
| BDO:PET Mole Ratio | | 3:1 | 3:1 | 3:1 |
| PET Weight | Kgs | 45.4 | 11.4 | 45.4 |
| BDO Weight | Kgs | 63.6 | 15.9 | 63.6 |
| Nylon 6,6 Weight | gms | 1300 | 650 | 2080 |
| TPT as Ti element | ppm | 60 | 60 | 60 |

Example 9: modified PBT made from PET containing 2.9 wt. % Nylon 6,6.

Example 10: modified PBT made from PET containing 4.6 wt. % Nylon 6,6.

Example 11: modified PBT made from PET containing 5.75 wt. % Nylon 6,6.

Examples 9 and 11 were generated in the 65-gallon helicone reactor, and Example 10 was generated in a 10-gallon helicone reactor as describer above. Raw material amounts are listed in Table 10. The method to conduct this experiment was also similar to that described before. DSC, IV, and composition data by NMR A are listed in Table 11.

TABLE 11

| Item | Parameter | Unit | Comp. A | 9 | 10 | 11 |
|---|---|---|---|---|---|---|
| | Wt. % Nylon-6,6 in PET Component | % | — | 2.9 | 4.6 | 5.75 |
| DSC Data | Melting Point | °C. | 229.1 | 215.2 | 210.1 | 206.7 |
| | Crystallization Temp | °C. | 167.3 | 164.2 | 168.3 | 148.8 |
| | Delta H fusion | kJ/kg | 37.9 | 23.7 | 32.3 | 24.9 |
| | Delta H crystallization | kJ/kg | 44.9 | 38.6 | 40.8 | 33.4 |
| IV | | Dl/g | 1.0 | 1.0 | 0.84 | 1.00 |
| Composition by NMR analysis based on total diol and diacid units) | EG Repeat Unit | mol % | 0.0 | 0.4 | | 0.9 |
| | DEG Repeat Unit | mol % | 0.0 | 0.2 | | 0.2 |
| | BDO Repeat Unit | mol % | 50.0 | 49.3 | | 47.5 |
| | Isophthalic Repeat Unit | mol % | 0.0 | 1.1 | | 1.1 |
| | Terephthalic Repeat Unit | mol % | 50.0 | 49 | | 48.3 |
| | Total Comonomers | mol % | 0.0 | 1.7 | | 2.2 |
| | Total Comonomer Equivalents | ** | 0.0 | 3.4 | | 4.4 |

** Residual equivalents relative to the total of 100 equivalents of diol and 100 equivalents of diacid groups It is evident from the above examples that one could make modified PBT containing Nylon 6,6 with a comparable molecular weight to commercial PBTs. It should also be noted that no substantial degradation of the Nylon 6,6 material was observed in the polymerization process. Surprisingly, the Nylon 6,6 seems to retain its identity as a separate polymer through the polymerization process.

The physical and mechanical properties of Examples 9-11 and Comparative Example A (PBT-309) are shown in Table 12.

TABLE 12

| Property (Units) | Comp. A | 9 | 10 | 11 |
|---|---|---|---|---|
| Nylon-6,6 as % of PET Component | — | 2.9 | 4.6 | 5.75 |
| Modulus of Elasticity (MPa) | 2600 | 2830 | | 2430 |
| Stress at Yield (MPa) | 53.9 | 50.4 | | 54.6 |
| Stress at Break (MPa) | 31.5 | 40.1 | | 53.3 |
| Tensile Elongation at Yield (%) | 3.4 | 3.1 | | 3.3 |
| Tensile Elongation at Break (%) | 390.5 | 320.6 | | 3.4 |
| HDT at 0.455 MPa (° C.) | 111 | 99.1 | 56 | 59 |
| HDT at 1.82 MPa (° C.) | 46.9 | 48.1 | 43.5 | 42.1 |
| Notched Izod (J/m) | 55.8 | 51.9 | 45.3 | 30.8 |
| Unnotched Izod (J/m) | 1979 | 1780 | 1940 | 1290 |
| Flexural Modulus (MPa) | 2350 | 2400 | 2300 | 2260 |
| Flexural Stress at 5% Strain (MPa) | 78.6 | 81.5 | 74.9 | 72.7 |
| Flexural Stress at Yield (MPa) | 79.6 | 81.9 | 75.1 | 72.9 |
| Energy to max load (J) | 28.6 | 27.6 | | 9.9 |
| Energy to failure (J) | 53.7 | 43.2 | | 10.7 |
| Energy Total (J) | 54.3 | 44 | | 10.7 |
| Max Load (kN) | 3.961 | 3.72 | | 2.4 |
| Deflection at max load (mm) | 14 | 13.4 | | 8.5 |
| Mold Shrink Parallel (%) | 1.74 | 1.8 | | 1.7 |
| Mold Shrink Perpendicular (%) | 1.83 | 1.79 | | 1.6 |
| MVR (cc/10 min) | 17.8 | 55.4 | | 46.3 |

It is seen from the table that the modified PBT has substantial decrease in properties such as HDT at 0.455 MPa and unnotched Izod at 5.75 wt. % nylon-6,6 in the PET component. As such, when the modified PBT contained Nylon 6,6 in the amount of 5.75 wt. %, based on the PET component, the modified PBT exhibited inferior heat deflection temperature and inferior ductility, thereby making the modified PBT undesirable for commercial use.

Examples 12 to 15

Modified PBT Containing Polylactic Acid (PLA)

Several modified PBT resins containing different levels of PLA:
Example 12: Modified PBT made from PET containing 1.44 wt. % PLA.
Example 13: Modified PBT made from PET containing 2.9 wt. % PLA
Example 14: Modified PBT made from PET containing 5.75 wt. % PLA
Example 15: Modified PBT made from PET containing 8 wt. % PLA Examples 12, 14, and 15 were generated in the 65-gallon helicone reactor and Example 13 was generated in the 10 gallon reactor as described before. The ingredients are listed in Table 13.

TABLE 13

| Parameter | Unit | 12 | 13 | 14 | 15 |
|---|---|---|---|---|---|
| Wt. % PLA (based on the PET Component) | wt % | 1.44 | 2.9 | 5.75 | 8 |
| Polyester Type | — | Recycled PET | Recycled PET | Recycled PET | Recycled PET |
| BDO:PET Mole Ratio | — | 3:1 | 3:1 | 3:1 | 3:1 |
| PET Weight | Kgs | 45.4 | 11.4 | 45.4 | 45.4 |
| BDO Weight | Kgs | 64.6 | 15.9 | 64.6 | 64.6 |
| PLA Weight | g | 654 | 331 | 2590 | 3630 |
| TPT as Ti element | ppm | 60 | 60 | 60 | 60 |

The methods to conduct these experiments are also similar to that described before. DSC, IV, and composition data by NMR of Examples 13, 14, 15, and Comparative Example A (PBT-2) are reported in Table 14.

TABLE 14

| Item | Parameter | Unit | Comp. A | 13 | 14 | 15 |
|---|---|---|---|---|---|---|
| PLA Wt. % (based on the PET Component) | | % | N/A | 2.9 | 5.75 | 8 |
| DSC Data | Melting Point | ° C. | 229.1 | 206.51 | 213.6 | 206.9 |
| | Crystallization Temp | ° C. | 167.3 | 145.03 | 159.8 | 163.13 |
| | DH fusion | ° C. | 37.9 | 20.2161 | 25 | 29.17 |
| | DH crystallization | kJ/kg | 44.9 | 31.2356 | 36 | 206.9 |
| Intrinsic Viscosity | | dl/g | 1.0 | 1.19 | 0.949 | 0.97 |

It was evident from the above example that one could make modified PBT with a comparable molecular weight to commercial PBTs. The physical and mechanical properties of Examples 12-15 and Comparative Example A are listed in Table 15.

TABLE 15

| Property (Units) | Comp. A | 12 | 13 | 14 | 15 |
|---|---|---|---|---|---|
| PLA Wt. % (based on the PET Component) | N/A | 1.44 | 2.9 | 5.75 | 8 |
| Modulus of Elasticity (MPa) | 2600 | 2550 | 2760 | 2820 | 2380 |
| Stress at Yield (MPa) | 53.9 | 54.6 | 50.2 | 50.2 | 54.4 |
| Stress at Break (MPa) | 31.5 | 33.3 | 39.1 | 41.6 | 29.1 |
| Elongation at Yield (%) | 3.4 | 3.2 | 3.1 | 3.1 | 3.6 |
| Elongation at Break (%) | 390.5 | 237 | 254.3 | 93.7 | 320.4 |
| HDT at 0.455 MPa (° C.) | 111 | 53.2 | 55.6 | 73 | 56.5 |
| HDT at 1.82 MPa (° C.) | 46.9 | 44 | 44.1 | 45.3 | 43.4 |
| Notched Izod (J/m) | 55.8 | 41.4 | 55.3 | 58.8 | 42.9 |
| Unnotched Izod (J/m) | 1979 | 2030 | 1590 | 1650 | 2050 |
| Flex Modulus (MPa) | 2350 | 2400 | 2420 | 2360 | 2350 |
| Flex Stress at 5% Strain (MPa) | 78.6 | 77.9 | 78 | 78.3 | 74.4 |
| Flex Stress at Yield (Mpa) | 79.6 | 77.9 | 78.2 | 78.4 | 74.5 |
| Energy to max load (J) | 28.6 | 18.1 | 30.5 | 22.5 | 23.7 |
| Energy to failure (J) | 53.7 | 29.6 | 49.2 | 37.8 | 33.4 |
| Energy Total (J) | 54.3 | 30.2 | 49.6 | 38.3 | 33.7 |
| Max Load (kN) | 3.961 | 2.79 | 4.11 | 3.38 | 3.76 |
| Deflection at max load (mm) | 14 | 10.6 | 14.7 | 12.1 | 13.2 |
| Mold Shrink Parallel (%) | 1.74 | 1.71 | 2.16 | 1.79 | 1.67 |
| Mold Shrink Perpendicular (%) | 1.83 | 1.64 | 2.18 | 1.82 | 1.62 |
| MVR (cc/10 min) | 17.8 | | 12.9 | 35.2 | |

It is seen from the above example that no statistically significant trends in performance was observed for the properties of the modified PBT when the PLA concentration in the PET component was increased up to 8 wt. %.

All the modified PBTs made from PET components containing various PLA amounts exhibited no statistically significant difference in mechanical performance, as compared to the virgin PBT homopolymer. Impact modified molding composition made from PLA containing modified PBT resins, Examples 25 and 26, were prepared using a twin screw extruder as described before, with ingredients listed in Table 16.

TABLE 16

| Ingredient | Comp. B | 25 | 26 |
| --- | --- | --- | --- |
| PLA as % of PET Component | — | 2.9 | 5.75 |
| PBT-3 | 37.3% | | |
| Example 22 | | 37.3% | |
| Example 23 | | | 37.3% |
| PC-1 (PC 105, 100 Grade) | 47.05% | 47.05% | 47.05% |
| Seenox 412S (Antioxidant) | 0.20% | 0.20% | 0.20% |
| Phosphorus Acid | 0.05% | 0.05% | 0.05% |
| AP | 0.20% | 0.20% | 0.20% |
| MBS | 15.20% | 15.20% | 15.20% |

The mechanical properties of molding composition Examples 25 and 26 and Comparative Example B are shown reported in Table 17.

TABLE 17

| Property (Units) | Comp. B | 25 | 26 |
| --- | --- | --- | --- |
| PLA as % of PET Component | — | 2.9 | 5.75 |
| Modulus of Elasticity (MPa) | 2200 | | 1990 |
| Stress at Yield (MPa) | 45 | 46.6 | 49 |
| Stress at Break (MPa) | 46 | 36.7 | 39.6 |
| Tensile Elongation at Yield (%) | 4 | 3.6 | 4 |
| Tensile Elongation at Break (%) | 140 | 115.9 | 104.4 |
| HDT at 0.455 MPa (° C.) | 104 | 89 | 92.9 |
| HDT at 1.82 MPa (° C.) | 83 | 61 | 71.7 |
| Notched Izod (J/m) | 700 | 685 | 670 |
| Unnotched Izod (J/m) | — | 2140 | 1970 |
| Flexural Modulus (MPa) | 2000 | 1950 | 2060 |
| Flexural Stress at Yield (MPa) | 74 | 66.7 | 71.5 |
| Flexural Stress at Break (MPa) | — | 66.8 | 71.8 |
| Energy to max load (J) | — | 45.8 | |
| Energy to failure (J) | — | 51.6 | 55.2 |
| Energy Total (J) | 50 | 51.6 | 55.2 |
| Max Load (kN) | — | 4.301 | 4.483 |
| Deflection at max load (mm) | — | 19.8 | 20 |
| Mold Shrink Parallel (%) | — | 0.7 | 0.85 |
| Mold Shrink Perpendicular (%) | — | 0.73 | 0.87 |

It is seen from the above data that no statistically significant trends in the properties of the molding composition were observed when the PLA concentration is increased up to 5.75 wt. % in the PET component. As such, when the molding composition contained PLA in the amount of up to 5.75 wt. %, based on the PET component, the molding composition exhibited properties that were suitable for commercial use.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A process comprising:
depolymerizing, with 1,4-butane diol,
a first polymer comprising a polyethylene terephthalate component selected from the group consisting of polyethylene terephthalate homopolymers, polyethylene terephthalate copolymers, and combinations thereof, in the presence of
at least one second polymer selected from the group consisting of polyvinyl chlorides, polyvinylidene chlorides, polyamides, polylactic acid, and combinations thereof,
in a reactor at a first temperature and a first pressure that is at least atmospheric pressure, for a time and under conditions effective to produce a molten mixture comprising
a first component selected from the group consisting of oligomers containing ethylene terephthalate groups, oligomers containing ethylene isophthalate groups, oligomers containing diethylene terephthalate groups, oligomers containing diethylene isophthalate groups, oligomers containing butylene terephthalate groups, oligomers containing butylene isophthalate groups, covalently bonded oligomeric moieties containing at least two of the foregoing groups, 1,4-butane diol, ethylene glycol, and combinations thereof; and
a second component selected from the group consisting of
(i) the at least one second polymer selected from the group consisting of polyvinyl chlorides, polyvinylidene chlorides, polyamides, polylactic acid, and combinations thereof;
(ii) at least one residue derived from the at least one second polymer selected from the group consisting of polyvinyl chlorides, polyvinylidene chlorides, polyamides, polylactic acid, and combinations thereof; and
(iii) combinations thereof; and
polymerizing the molten mixture at a second temperature that is higher than the first temperature, a second pressure that is lower than the first pressure and that is subatmospheric pressure, with agitation under an inert atmosphere, for a time and under conditions sufficient to form a modified polybutylene terephthalate copolymer having a melting temperature of more than 200° C. and an intrinsic viscosity ranging from 0.5 to 1.4 dL/g, comprising
(a) at least one polyethylene terephthalate component residue, and
(b) a member selected from the group consisting of
(i) the at least one second polymer selected from the group consisting of polyvinyl chlorides, polyvinylidene chlorides, polyamides, polylactic acid, and combinations thereof;
(ii) the at least one residue derived from the second polymer; and
(iii) combinations thereof.
2. The process of claim 1, wherein depolymerizing is conducted with agitation under an inert atmosphere.
3. The process of claim 1, wherein the at least one polyethylene terephthalate component residue is selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, naphthalene dicarboxylic acids, 1,3-propanediol groups, and combinations thereof.
4. The process of claim 1, wherein the at least one polyethylene terephthalate component residue is selected from the group consisting of ethylene glycol, diethylene glycol, isoph- thalic acid, cobalt-containing compounds, antimony-containing compounds, isophthalic acid groups, and combinations thereof.

5. The process of claim 1, wherein the at least one polyethylene terephthalate component residue is selected from the group consisting of cis isomer of 1,3-cyclohexane dimethanol, cis isomer of 1,4-cyclohexane dimethanol, trans isomer of 1,3-cyclohexane dimethanol, trans isomer of 1,4-cyclohexane dimethanol and combinations thereof.

6. The process of claim 1, wherein the at least one polyethylene terephthalate component residue is selected from the group consisting of ethylene glycol groups, diethylene glycol groups, and cyclohexane dimethanol groups; and the polyethylene terephthalate component residue is in an amount ranging from 0.1 to 10 mole %, based on 100 mole % of glycol in the modified polybutylene terephthalate copolymer.

7. The process of claim 6, wherein the at least one polyethylene terephthalate component residue further comprises isophthalic acid groups in an amount ranging from more than 0 to 10 mole %, based on 100 mole % of acid functionality in the modified polybutylene terephthalate random copolymer.

8. The process of claim 1, wherein
prior to depolymerizing the polyethylene terephthalate component, the second polymer comprises more than 0 to less than 290 ppm of polyvinyl chloride, based on the total parts by weight of the polyethylene terephthalate component; and
a sample molded from the modified polybutylene terephthalate copolymer has an unnotched Izod strength of 1500 to 2500 J/m, measured in accordance with ASTM D256, and a tensile elongation at break of at least 100%, measured in accordance with ASTM D638.

9. The process of claim 1, wherein
prior to depolymerizing the polyethylene terephthalate component, the second polymer comprises more than 0 to less than 5.7 wt. % of a polyamide as the second polymer, based on the total weight of the polyethylene terephthalate component, wherein the polyamide is Nylon 6; and
a molded sample of the modified polybutylene terephthalate copolymer has a tensile elongation at break of at least 100%, measured in accordance with ASTM D638.

10. The process of claim 1, wherein
prior to depolymerizing the polyethylene terephthalate component, the second polymer comprises more than 0 to less than 1.45 wt. % of a polyamide as the second polymer, based on the total weight of the polyethylene terephthalate component;
the polyamide is Nylon 6; and
a molded sample of the modified polybutylene terephthalate copolymer has a heat deflection temperature at 0.455 MPa of at least 90° C., measured in accordance with ASTM D648.

11. The process of claim 1, wherein
prior to depolymerizing the polyethylene terephthalate component, the second polymer comprises more than 0 to less than 5.7 wt. % of a polyamide as the second polymer, based on the total weight of the polyethylene terephthalate component;
the polyamide is Nylon 6,6; and
a molded sample of the modified polybutylene terephthalate copolymer has a tensile elongation at break that is at least 100%, measured in accordance with ASTM D638.

12. The process of claim 1, wherein
prior to depolymerizing the polyethylene terephthalate component, the second polymer comprises more than 0 to less than 4.6 wt. % of a polyamide as the second polymer, based on the total weight of the polyethylene terephthalate component;
the polyamide is Nylon 6,6; and
a molded sample of the modified polybutylene terephthalate copolymer has a heat deflection temperature at 0.455 MPa that is at least 70° C., measured in accordance with ASTM D648.

13. The process of claim 1, wherein depolymerizing the polyethylene terephthalate is carried out at a temperature from 180° C. to 230° C.

14. The process of claim 1, wherein depolymerizing the polyethylene terephthalate component is carried out at a pressure from 100 kPa to 500 kPa absolute.

15. The process of claim 1, wherein depolymerizing the polyethylene terephthalate component is carried out for at least 30 minutes.

16. The process of claim 1, wherein the second temperature is from 230° C. to 260° C.

17. The process of claim 1, wherein the second pressure is less than 0.3 kPa absolute.

18. The process of claim 1, wherein the polymerization of the molten mixture is carried out for at least 60 minutes.

19. The process of claim 1, wherein a catalyst is present during a step selected from the group consisting of (i) depolymerizing the polyethylene terephthalate component, (ii) polymerization of the molten mixture, and (iii) combinations thereof.

20. The process of claim 1, wherein a basic compound is present during a step selected from the group consisting of (i) depolymerizing the polyethylene terephthalate component, (ii) polymerization of the molten mixture, and (iii) a combination thereof.

21. The process of claim 1, wherein the process is carried out in at least two reactors.

22. A composition comprising a modified polybutylene terephthalate copolymer having a melting temperature of more than 200° C. and an intrinsic viscosity ranging from 0.5 to 1.4 dL/g, and comprising
(a) at least one residue derived from a polyethylene terephthalate component; and
(b) a member selected from the group consisting of
(i) at least one polymer selected from the group consisting of polyvinyl chlorides, polyvinylidene chlorides, polyamides, polylactic acid, and combinations thereof;
(ii) at least one residue derived from a polymer selected from the group consisting of polyvinyl chlorides, polyvinylidene chlorides, polyamides, polylactic acid, and combinations thereof; and
(iii) combinations thereof.

23. The composition of claim 22, wherein
the at least one polymer comprises polyvinyl chloride as the second polymer, present in an amount of more than 0 and less than 220 ppm of, based on the total parts by weight of the polyethylene terephthalate component; and
a molded sample of the composition has an unnotched Izod strength of 1500 to 2500 J/m, measured in accordance with ASTM D256, and a tensile elongation at break that is at least 100%, measured in accordance with ASTM D638.

24. The composition of claim 22, wherein
the at least one polymer comprises Nylon 6 as the second polymer, present in an amount of more than 0 and less than 5.7 wt. % of, based on the total weight of the polyethylene terephthalate component, and a molded sample of the composition has a tensile elongation at break that is at least 100%, measured in accordance with ASTM D638.

25. The composition of claim 22, wherein
the at least one polymer comprises Nylon 6 as the second polymer, present in an amount of more than 0 and less than 1.45 wt. %, based on the total weight of the polyethylene terephthalate component; and
a molded sample of the modified polybutylene terephthalate copolymer has a heat deflection temperature at 0.455 MPa that is at least 90° C., measured in accordance with ASTM D648.

26. The composition of claim 22, wherein
the at least one polymer comprises Nylon 6,6 as the second polymer, present in an amount of more than 0 and less than 5.7 wt. %, based on the total weight of the polyethylene terephthalate component; and
a molded sample of the modified polybutylene terephthalate copolymer has a tensile elongation at break that is at least 100%, measured in accordance with ASTM D638.

27. The composition of claim 22, wherein
the at least one polymer comprises Nylon 6,6 as the second polymer, present more than 0 and less than 4.6 wt. %, based on the total weight of the polyethylene terephthalate component, and
a molded sample of the modified polybutylene terephthalate copolymer has a heat deflection temperature at 0.455 MPa that is at least 70° C., measured in accordance with ASTM D648.

28. The composition of claim 22, wherein the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, naphthalene dicarboxylic acids, 1,3-propanediol groups, and combinations thereof.

29. The composition of claim 22, wherein the at least one residue derived from the polyethylene terephthalate component comprises mixtures of ethylene glycol and diethylene glycol.

30. An article comprising the composition of claim 22.

31. A composition comprising a modified polybutylene terephthalate copolymer having a melting temperature of more than 200° C. and an intrinsic viscosity ranging from 0.5 to 1.4 dL/g, and comprising
(a) at least one residue derived from a polyethylene terephthalate component; and
(b) a member selected from the group consisting of
(i) at least one polymer selected from the group consisting of polyvinyl chlorides, polyvinylidene chlorides, polyamides, polylactic acid, and combinations thereof;
(ii) at least one residue derived from a polymer selected from the group consisting of polyvinyl chlorides, polyvinylidene chlorides, polyamides, polylactic acid; and combinations thereof; and
(iii) combinations thereof;
wherein
the modified polybutylene terephthalate copolymer is derived from a polyethylene terephthalate mixture comprising a second polymer selected from the group consisting of
more than 0 to less than 290 ppm polyvinyl chloride,
more than 0 to less than 5.7 wt. % Nylon 6;
more than 0 to less than 5.7 wt. % Nylon 6,6; and
optionally, more than 0 to less than 8 wt. % polylactic acid, each based on the parts by weight or weight of the polyethylene terephthalate component; and
the residue derived from the polyethylene terephthalate component is selected from the group consisting of ethylene glycol groups, diethylene glycol groups, isophthalic acid groups, antimony-containing compounds, germanium-containing compounds, titanium-containing compounds, cobalt-containing compounds, tin containing compounds, aluminum, aluminum salts, 1,3-cyclohexane dimethanol isomers, 1,4-cyclohexane dimethanol isomers, alkali salts, alkaline earth metal salts, phosphorous-containing compounds and anions, sulfur-containing compounds and anions, naphthalene dicarboxylic acids, 1,3-propanediol groups, and combinations thereof.

32. The composition of claim 31, wherein the at least one residue derived from the polyethylene terephthalate component comprises mixtures of ethylene glycol and diethylene glycol.

33. An article comprising the composition of claim 31.

* * * * *

UNITED STATES PATENT AND TRADEMARK OFFICE
CERTIFICATE OF CORRECTION

| | | |
|---|---|---|
| PATENT NO. | : 7,910,657 B2 | Page 1 of 1 |
| APPLICATION NO. | : 12/346108 | |
| DATED | : March 22, 2011 | |
| INVENTOR(S) | : Kristen Cohoon-Brister | |

It is certified that error appears in the above-identified patent and that said Letters Patent is hereby corrected as shown below:

Title Page, Item (74), Attorney, Agent, or Firm, delete "Cantor Colburn LLP" and insert therefor --Cantor Colburn LLP, Diderico van Eyl--.

Signed and Sealed this

Twenty-fifth Day of October, 2011

David J. Kappos
*Director of the United States Patent and Trademark Office*